United States Patent
Glueck et al.

(10) Patent No.: US 11,143,227 B2
(45) Date of Patent: Oct. 12, 2021

(54) COMPONENT COMBINATION OF AT LEAST TWO COMPONENTS AND A METHOD FOR PRODUCING A COMPONENT COMBINATION JOINED IN A FORM-FITTING AND/OR FORCE-FITTING MANNER

(71) Applicant: Bayerische Motoren Werke Aktiengesellschaft, Munich (DE)

(72) Inventors: Bernhard Glueck, Fuerstenfeldbruck (DE); Robert Kirschner, Olching (DE); Josef Meinhardt, Munich (DE); Franz-Xaver Schweighart, Aholming (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 246 days.

(21) Appl. No.: 16/511,569

(22) Filed: Jul. 15, 2019

(65) Prior Publication Data
US 2019/0338798 A1 Nov. 7, 2019

Related U.S. Application Data

(63) Continuation of application No. PCT/EP2017/079873, filed on Nov. 21, 2017.

(30) Foreign Application Priority Data

Jan. 16, 2017 (DE) ...................... 10 2017 200 589.0

(51) Int. Cl.
*F16B 17/00* (2006.01)
*B21K 25/00* (2006.01)

(52) U.S. Cl.
CPC ............ *F16B 17/008* (2013.01); *B21K 25/00* (2013.01)

(58) Field of Classification Search
CPC ........ F16B 29/00; F16B 21/00; F16B 37/065; F16B 39/22; F16B 19/04; F16B 17/008;
(Continued)

(56) References Cited

U.S. PATENT DOCUMENTS

| 5,310,434 A | 5/1994 | Vives et al. |
| 6,039,706 A | 3/2000 | Bolla et al. |

(Continued)

FOREIGN PATENT DOCUMENTS

| CN | 1263215 A | 8/2000 |
| CN | 1268211 A | 9/2000 |

(Continued)

OTHER PUBLICATIONS

English Translation of Chinese-language Office Action issued in Chinese Application No. 201780070784.7 dated Sep. 27, 2020 (12 pages).

(Continued)

*Primary Examiner* — Lawrence Averick
(74) *Attorney, Agent, or Firm* — Crowell & Moring LLP

(57) ABSTRACT

A component combination of at least two components, which are joined at at least one joint, is provided. The component combination includes a first component, wherein a first joining element having a supporting section is pressed into a passage hole in the first component at the joint, and includes a second component, in which a fastening receiving section is formed at the joint, wherein the first joining element also has a fastening section, which engages in the fastening receiving section of the second component in a form-fitting and/or force-fitting manner. A method for producing the component combination is also provided.

11 Claims, 4 Drawing Sheets

(58) Field of Classification Search
CPC ......... B23P 11/02; B21K 25/00; B21K 19/02; B21J 15/00
See application file for complete search history.

(56) References Cited

U.S. PATENT DOCUMENTS

| | | | |
|---|---|---|---|
| 6,575,659 B1 | 6/2003 | Valtwies et al. | |
| 9,556,891 B2* | 1/2017 | Toyozumi | B29C 65/601 |
| 9,855,978 B2* | 1/2018 | Lankenau | B29C 66/742 |
| 10,330,136 B2* | 6/2019 | DiChiara, Jr. | F16B 39/10 |
| 2001/0005473 A1 | 6/2001 | Shiokawa et al. | |
| 2011/0097142 A1* | 4/2011 | Bassler | B23K 11/0046 403/337 |
| 2015/0003899 A1* | 1/2015 | Lankenau | B29C 65/606 403/270 |
| 2016/0061245 A1* | 3/2016 | Toyozumi | B29C 66/1122 411/82 |
| 2018/0135679 A1* | 5/2018 | DiChiara, Jr. | F16B 39/10 |

FOREIGN PATENT DOCUMENTS

| | | |
|---|---|---|
| DE | 36 40 484 A1 | 6/1988 |
| DE | 100 15 713 A1 | 10/2001 |
| DE | 10 2012 203 878 B3 | 4/2013 |
| DE | 10 2014 203 276 A1 | 8/2015 |
| EP | 0 390 685 A1 | 10/1990 |
| EP | 0 874 607 B1 | 11/2003 |

OTHER PUBLICATIONS

International Search Report (PCT/ISA/210) issued in PCT Application No. PCT/EP2017/079873 dated Jan. 29, 2018 with English translation (four (4) pages).
German Search Report issued in counterpart German Application No. 10 2017 200 589.0 dated Nov. 22, 2017 with partial English translation (13) pages).
Chinese language Office Action issued in Chinese Application No. 201780070784.7 dated Apr. 23, 2021 with English translation (20 pages).

* cited by examiner

COMPONENT COMBINATION OF AT LEAST TWO COMPONENTS AND A METHOD FOR PRODUCING A COMPONENT COMBINATION JOINED IN A FORM-FITTING AND/OR FORCE-FITTING MANNER

CROSS REFERENCE TO RELATED APPLICATIONS

This application is a continuation of PCT International Application No. PCT/EP2017/079873, filed Nov. 21, 2017, which claims priority under 35 U.S.C. § 119 from German Patent Application No. 10 2017 200 589.0, filed Jan. 16, 2017, the entire disclosures of which are herein expressly incorporated by reference.

BACKGROUND AND SUMMARY OF THE INVENTION

The invention relates to a component assembly of at least two components and to a method for producing a component assembly joined in a form- and/or force-fitting manner.

With the increasing use of lightweight materials in vehicle construction, for example light metals (for example aluminum, magnesium and alloys thereof) or fiber composite plastics, components made of different materials have to be joined together increasingly frequently to form a component assembly. On account of the different material properties, this is problematic and pushes many established joining processes to their limits.

In order to join aluminum components to steel components, it is known from the prior art to use auxiliary joining parts which are introduced in the manner of a rivet into a first component and are weldable to the material of the second component. The component assembly is then produced in that the second component is joined to the auxiliary joining element by way of resistance spot welding. By way of example, reference is made in this regard to the patent DE 100 15 713 A1. A drawback thereof is that the composite assembly has to be accessible from both sides for the welding process.

Furthermore, it is known to produce a composite assembly by force- or form-fitting connections, for example by screwing, riveting, clip-fastening etc. Depending on the material of the components to be joined together, these methods are also employable only to a limited extent and do not yield the requisite strengths.

Against this background, it is an object of the present invention to specify a possible way of producing a composite assembly which is employable for a wide variety of material combinations and is improved with respect to the prior art or has at least one advantage.

This and other objects are achieved by a composite assembly (or a component assembly) of at least two components which are joined at at least one joint and by a method for producing such a composite assembly, in accordance with embodiments of the invention.

A composite component of a first component and at least one second component which are joined at at least one joint is specified. At the joint, a first auxiliary joining element has been pressed with a retaining portion into a through-hole in the first component, and in the case of the second component, a fastening receptacle portion is formed at the joint. The first auxiliary joining element furthermore has a fastening portion which engages in a form- and/or force-fitting manner in the fastening receptacle portion of the second component.

The proposed configuration of the composite assembly allows the greatest possible flexibility in terms of the materials of the components to be joined. As regards the material and the form of their fastening portion or fastening receptacle portion, the auxiliary joining elements can be coordinated with one another largely independently of the material of the components. The pressing in of the auxiliary joining elements can take place independently of the actual operation of joining the components. In order to join the components, accessibility from only one side may then be sufficient.

The fastening receptacle portion may be formed in the base material of the second component. In a preferred configuration, the fastening receptacle portion is part of a second auxiliary joining element that has been pressed with a retaining portion into a through-hole in the second component at the joint.

The through-hole may be formed for example by cutting or punching and has preferably a closed hole contour or cut contour. With regard to the component surfaces, the through-hole is delimited in each case by a peripheral region. The auxiliary joining element is connected to the first component in a form- and/or force-fitting manner transversely to the joining axis. The hole geometry of the through-hole and the external geometry of the auxiliary joining element are coordinated with one another at least partially in a corresponding manner.

In a preferred configuration, at least one peripheral region of the hole wall of the through-hole in the first component or in the second component or in the first and the second component has an encircling indentation in which the retaining portion of the auxiliary joining element engages and into which said retaining portion is preferably pressed. In the region of the indentation, the hole cross-section is enlarged, for example the diameter of the through-hole is enlarged in the region of the chamfer. The pressed-in retaining portion of the auxiliary joining element forms, in the region of the indentation, an undercut, which secures the auxiliary joining element in one direction in a form-fitting manner with regard pushing through the through-hole. Contrary to the supposition that the reduced component thickness in the region of the indentation has a negative effect on the strength of the connection, it has been shown that surprisingly high strengths are achievable. This is presumed to be attributable to the process of indentation, whereby material consolidation in the peripheral region of the indentation is achieved, which, in combination with the subsequent pressing in of the retaining element, is increased even further. Furthermore, it has been found that, as a result of the introduction of the indentation, a reduction in hydrogen embrittlement occurs and a sensitivity to edge cracking in this region can be counteracted.

The indentation can be formed on one side. The indentation can extend for example by up to 20% into the depth of the through-hole, by up to 40% or up to half the depth of the through-hole. It may also be advantageous for the indentation to extend by more than 50% and in particular by more than 60% into the depth of the through-hole.

It has been found to be particularly advantageous when, in one configuration, the indentation is configured as an encircling chamfer. In the region of the chamfer, the hole wall is inclined with respect to the longitudinal axis of the through-hole and the diameter of the through-hole increases continuously in the region of the chamfer to the periphery of the through-hole. In the region of the chamfer, the hole wall can be inclined for example at an angle to the longitudinal axis of the through-hole, which is in a range from 30 to 60 degrees or in a range from 40 to 50 degrees and may in particular be 45 degrees.

In one configuration, this effect can be exploited on both sides of the component or components, to which end an encircling indentation or chamfer is impressed in both peripheral regions of the hole wall, the retaining portion of the auxiliary joining element engaging therein. The indentations or chamfers can be formed symmetrically such that identical indentations or chamfers are impressed on both sides of the through-hole, or can be formed asymmetrically, i.e. with different forms or angles and/or a different depth.

The through-hole and/or the indentation can have for example a circular cross-section or alternative cross-sections. Thus, it may be easier to introduce an adhesive when the cross-section of the hole and/or indentation has for example a jagged or polygonal shape, or the through-hole with the indentation is formed in a crown-shaped manner.

That portion of the auxiliary joining element that can transmit a force to the component when loaded is referred to as the retaining portion of the auxiliary joining element. Advantageously, the thickness of the retaining portion in the pressed-in state can be less than or substantially the same as the thickness of the component. The expression "substantially the same" should be understood in this connection as meaning that the thickness of the retaining element after pressing in can be the same as the thickness of the component or, due to manufacturing tolerances, can be for example a few tenths of a millimeter thicker than the component thickness. The through-hole with the indentation or chamfer affords the possibility of fixing the retaining element in the component in a form- and force-fitting manner in the direction of the joining axis, such that the retaining portion can be configured for example without a head, i.e. without a portion projecting laterally beyond the diameter of the through-hole. Advantageously, the retaining portion can have a geometry that is easy to produce and be formed for example in a cylindrical manner.

In one configuration, the retaining portion of the first auxiliary joining element, the retaining portion of the second auxiliary joining element, or both retaining portions is/are accommodated entirely in the through-hole, i.e. force transmission between the respective component and the retaining portion takes place exclusively at the hole wall of the through-hole. To this end, the retaining portion can end for example flush with the component surfaces or be set back into the through-hole with respect to said surfaces.

Furthermore, when the auxiliary joining element is pressed into the component, an interlayer element, for example a film for preventing contact corrosion or an adhesive layer, can additionally be introduced between the retaining portion and the hole wall.

The auxiliary joining element may have been additionally connected in a materially bonded manner to the interlayer element and/or the component into which it has been pressed.

The force- or form-fitting connection between the components takes place indirectly via the fastening portion and the fastening receptacle portion, which are engaged with one another. In one configuration, the fastening portion of the first auxiliary joining element and the fastening receptacle portion of the second auxiliary joining element cooperate as connecting partners in the manner of a clip connection. When a clip connection is brought together, usually one or both of the two connecting partners is/are elastically deformed in order that the connecting partners move past one another and can then catch in one another in a form-fitting manner. Such a connection is very stable and can nevertheless be designed to be releasable. Advantageously, the joining of a clip connection does not require any special tools, but can be realized for example by a movement that brings the components together.

In an alternative configuration, the fastening portion of the first auxiliary joining element is pressed permanently into the fastening receptacle portion of the second auxiliary joining element. The term "permanent" is understood here as meaning that the component connection is separable only by destroying or damaging the auxiliary joining elements or components. The fastening portion can be pressed in for example using a suitable pressing tool in the manner of riveting. To this end, the fastening portion can be configured for example as a pin-like element or compression tube, and the fastening receptacle portion can be configured for example as a cutout with an undercut. It is possible for an adhesive bond or the like to additionally be provided. The fastening portion and fastening receptacle portion can already be formed for example before the pressing-in operation or be formed by a correspondingly formed pressing tool during the pressing-in operation.

The components can be formed preferably from a sheet-metal material, for example a steel sheet, aluminum sheet or magnesium sheet, or a sheet-like material, for example fiber reinforced plastic, for example carbon-fiber, glass-fiber or aramid-fiber reinforced plastic, or it can be an organosheet. In principle, it can also be a cast part or profiled part, which is formed in a sheetlike manner at the joint. The above-described component connection is suitable for example particularly for material thicknesses in the range from 0.5 mm to 5 mm, and in particular also for thin sheets with a thickness of 2.99 mm or less.

In one advantageous configuration, the first and/or second component is/are made of a lightweight material, for example aluminum (alloy) or fiber composite plastic, and the auxiliary joining elements are made of steel.

The components can be preferably vehicle components. Preferably, the component assembly is an assembly component (sandwich component) and in particular a body component. However, it can also be a chassis component or an interior component.

The component assembly can have a single joint, but preferably the components are connected together at a plurality of joints. The plurality of joints can be formed in an identical or different manner.

The component assembly can furthermore have a third or further components, which are likewise connected with the aid of the described method or by way of other known joining methods.

Furthermore, a method for producing a component assembly from at least two components which have been joined at at least one joint is specified. The method includes the acts of:

creating a through-hole at at least one joint in a first component;

pressing a first auxiliary joining element into the through-hole in the first component such that a retaining portion of the first auxiliary joining element is connected to the hole wall in a force- and/or form-fitting manner, wherein the auxiliary joining element furthermore has a fastening portion;

introducing a fastening receptacle portion into at least one joint in a second component;

positioning and orienting the first component relative to the second component; and bringing together the fastening portion and fastening receptacle portion such that they engage in one another in a force- and/or form-fitting manner.

The fastening receptacle portion can be formed directly in the base material of the second component, for example by creating a cutout or the like.

In one configuration, the introduction of the fastening receptacle portion into the second component comprises the further acts of:

creating a through-hole at at least one joint in the second component; and pressing a second auxiliary joining element into the through-hole in the second component such that a retaining portion of the second auxiliary joining element is connected to the hole wall in a force- and/or form-fitting manner, wherein the second auxiliary joining element furthermore has the fastening receptacle portion.

The through-hole can be formed for example by punching or cutting. If the component is made of fiber composite plastic (FRP), the through-hole can also already be formed during the production of the component, for example during the pressing of the component semi-finished product.

In a preferred configuration, an indentation or chamfer is impressed in a peripheral region of the through-hole in the first component, in the second component or in both components. The impressing can take place for example by way of a correspondingly formed impressing tool. This can take place at the same time as the creation of the through-hole or in a separate production step, for example before or after the creation of the through-hole. In the case of an FRP component, the indentation can for example already be formed during the production of the FRP component, for example during the pressing of the component semi-finished product. Such an indentation, too, achieves the described consolidation on account of an increased fiber volume ratio in the peripheral region of the through-hole.

If the through-hole is formed in a metal component, it may be advantageous, in one configuration, for the impression of the indentation or chamfer to take place before the formation of the through-hole. The impression of the indentation or chamfer creates a notch in the metal component, wherein any component coating or oxide layer that is present is at least partially retained at the notch surfaces.

Furthermore, during the pressing of the auxiliary joining element into the component, a protective layer, for example a film for preventing contact corrosion, can additionally be introduced between the auxiliary joining element and the hole wall.

With the method, the components can be connected in a pre-fixed manner and subsequently be additionally connected together by further joining methods. It is likewise possible for the component assembly to be formed only by the above-described method, wherein the components are joined preferably at a plurality of joints.

If a further layer is additionally introduced between the auxiliary joining element and the component (for example for electrochemical separation or an adhesive layer), a material bond can additionally be achieved by the pressing and/or a heat treatment. The heat treatment can take place before, during or after the pressing-in operation.

The auxiliary joining element is pressed in for example with a suitable tool, for example a pressing tool or a C clamp. To this end, the retaining portion is introduced into the corresponding through-hole and pressed there, wherein the material of the retaining portion is permanently deformed and is pressed against the hole wall in a force-fitting manner. Furthermore, in one configuration, provision can be made for the material of the retaining portion to additionally flow into the indented or chamfered region and to form in each case an undercut there. The auxiliary joining element is thus also fixed in the component in a form-fitting manner in the direction of the joining axis F.

Furthermore, it is possible for the through-hole and/or the indentation not to be created in a separate step but rather by the introduction of the auxiliary joining element itself. The through-hole can be created for example in that a self-tapping auxiliary joining element is driven, for example by way of rotary impact, into the component. Likewise, the auxiliary joining element can be formed by a preformed element, for example in the manner of a threaded bush or helicoil.

If, in one configuration, an encircling indentation or chamfer is impressed at both peripheral regions of the hole wall, said indentation or chamfer can be created as described for the first indentation or chamfer. During the pressing of the retaining portion into the through-hole, the retaining portion then forms an undercut at the two indentations or chamfers, said undercut fixing it in the through-hole.

The positioning, orienting and bringing together of the components can preferably take place in an automated manner, for example with a correspondingly programmed handling device.

The method is used to produce the above-described component assembly, and so the same technical effects and advantages are achieved as are described with respect thereto.

The invention has, inter alia, the following advantages: the method allows the cost-effective and reproducible production of component assemblies and assembly components, in particular in a mixed construction; the component assembly can be designed to be releasable; the joining of the component assembly is also possible with accessibility from one side; the thickness of the component assembly can be reduced to the thickness of the components to be connected;

the component connection can be neutral or advantageous in terms of weight compared with known joined connections; the joined connection according to the invention is suitable in particular for thin-sheet connections; and/or the method allows easy joining of components in the press plant.

The above-described properties, features and advantages of this invention and the manner in which these are achieved will become more clearly understandable from the drawing and in conjunction with the following description of the exemplary embodiments. Where the term "can" or "may" is used in this application, this relates both to the technical possibility and to the actual technical implementation.

In the following text, exemplary embodiments are explained on the basis of the accompanying drawings, in which, in each case in a schematic illustration.

DETAILED DESCRIPTION OF THE DRAWINGS

Figure 1:
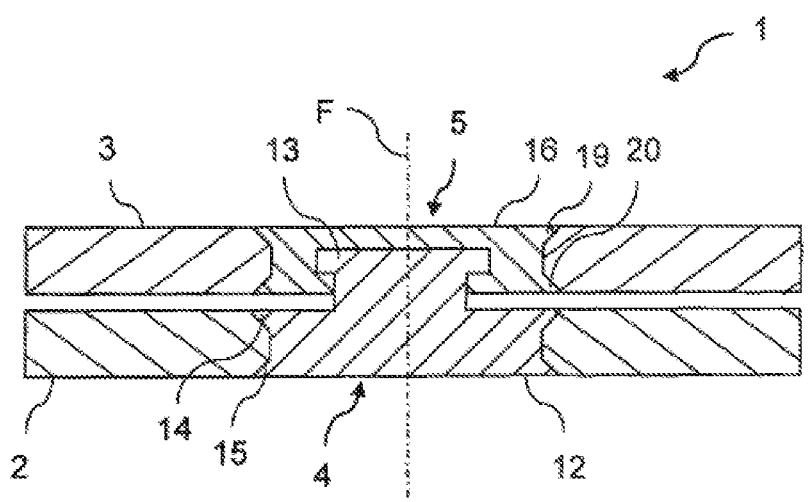
FIG. 1 is a sectional view of a first example of a component assembly.

FIG. 1 shows a sectional illustration of the joint of a component assembly 1, which includes two components 2, 3. The component assembly 1 has been produced by a method according to embodiments of the invention. The component assembly 1 can have a plurality of such joints, which may be formed identically or differently.

The first component 2 is a component made of an aluminum sheet. The term aluminum also includes the corresponding aluminum alloys. The second component 3 is likewise formed from an aluminum sheet. The two components 2, 3 have been joined indirectly at the joint by way of a first auxiliary joining element 4, which has been pressed into the first component 2, and a second auxiliary joining element 5, which has been pressed into the second component 3, for which purpose the two auxiliary joining elements 4 and 5 are connected together in a force- and form-fitting manner. The first and second auxiliary joining elements 4, 5 are made of a steel material.

Figure 2A:
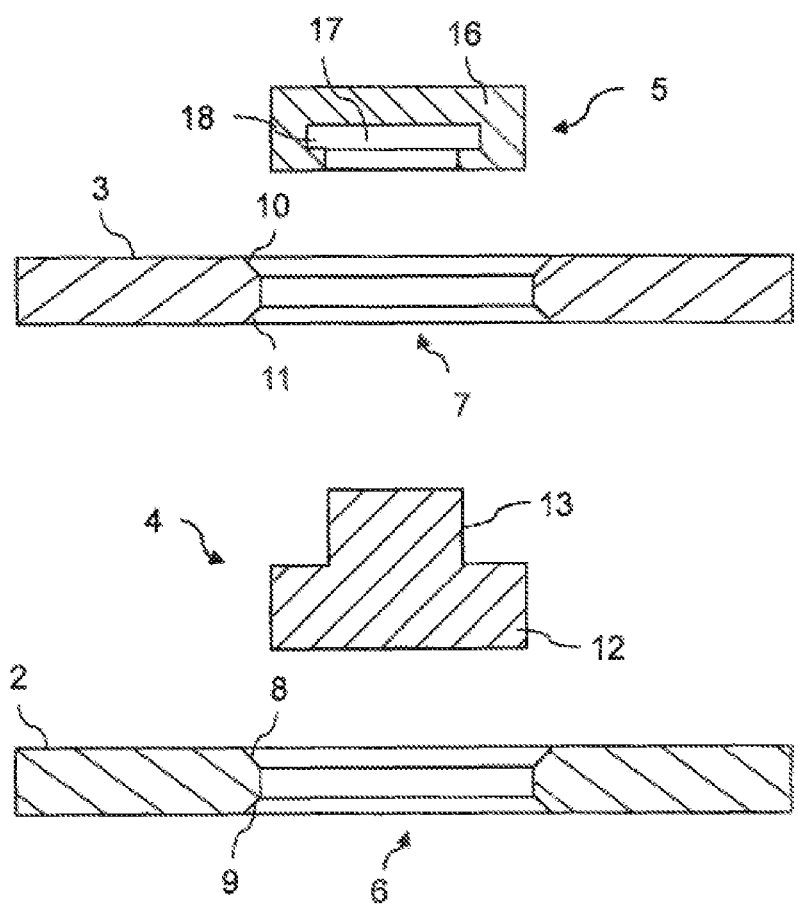
FIGS. 2A, 2B show a procedure for producing the component assembly.
Figure 2B:
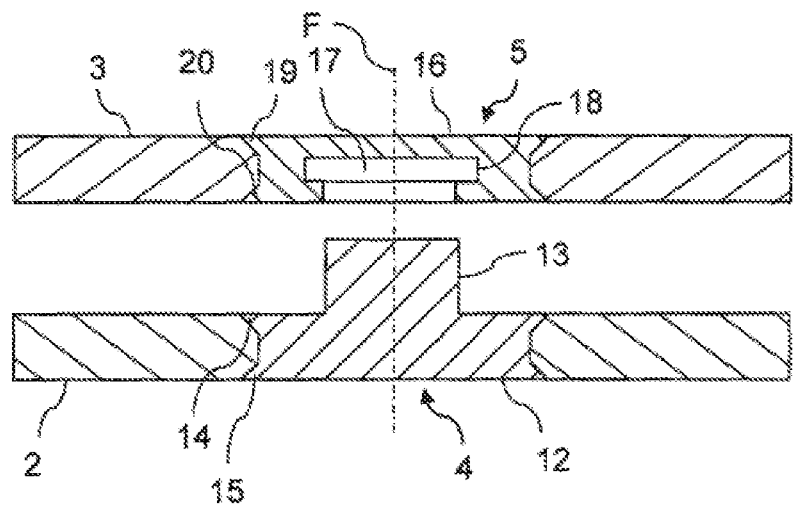

FIGS. 2A and 2B show steps on the production path.

In the first component 2 and second component 3, respective through-holes 6, 7 are formed at the joint. In the peripheral regions of the hole wall, respective encircling indentations 8, 9 and 10, 11, respectively, in the form of chamfers have been impressed.

The first auxiliary joining element 4 is pressed into the first component 2. The first auxiliary joining element 4 has a head-free retaining portion 12 with a cylindrical shape, and a fastening portion 13. By way of the retaining portion 12, the fixing in the first component 2 takes place; the fastening portion 13 serves for the subsequent connection to the second auxiliary joining element 5 in the second component 3.

The cylindrical retaining portion 12 is introduced into the first through-hole 6 and pressed there with a suitable pressing tool, wherein the material of the retaining portion 12 is permanently deformed and is pressed in a force-fitting manner against the hole wall. In addition, the material of the retaining portion 12 flows into the chamfered region and forms in each case an undercut 14, 15 there (see FIG. 2B). The first auxiliary joining element 4 is thus also fixed in the first component 2 in a form-fitting manner in the direction of the joining axis F. As the second auxiliary joining element 5, use is made for example of a cylindrical metal slug. The cylinder wall forms the retaining portion 16, and the fastening receptacle portion 17 is formed by a cutout, projecting into the interior of the metal slug, with a recess 18.

The pressing of the second auxiliary joining element 5 into the second component 3 takes place as described above for the first auxiliary joining element 4. Two undercuts 19, 20 are likewise formed, which fix the second auxiliary joining element 5 in the second component 3 in a form-fitting manner in the joining direction F.

The retaining portions 12 and 16 are received entirely in the first component 2 and second component 3, respectively, i.e. they are not supported on a surface of the component but merely on the hole wall in the component. The fastening portion 13 protrudes from the first component 2. The fastening portion 13 and the fastening receptacle portion 17 can have already been formed before pressing in or alternatively be formed during the pressing-in of the auxiliary joining element 4 or 5, respectively, for example by deformation of a part of the retaining portion.

To produce the component assembly, the components are moved together such that the fastening portion 13 and the fastening receptacle portion 17 engage in one another. With reference to FIG. 2B, the pin-like fastening portion 13 is pressed into the fastening receptacle portion 17 and plastically deformed, wherein it forms an undercut at the recess 18 for permanently connecting the components 2, 3 in a form-fitting manner.

Figure 3:
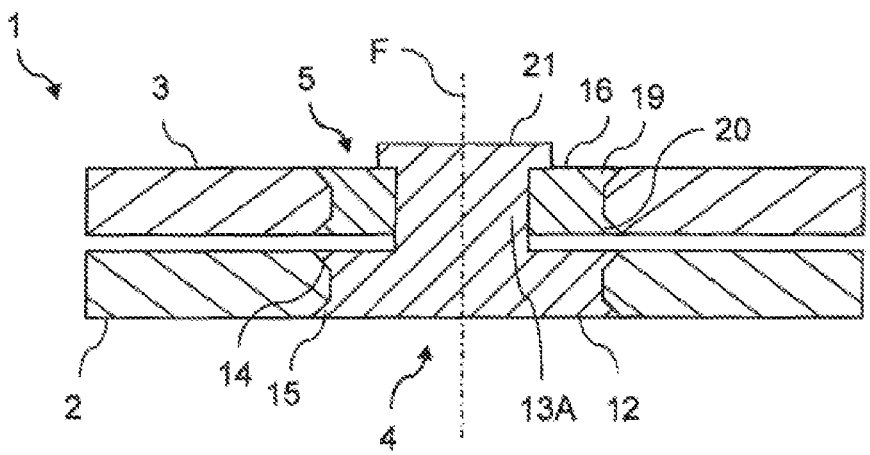
FIGS. 3 to 7 are sectional views of further examples of component assemblies.

FIG. 3 shows an alternative configuration of the component assembly 1. The fastening receptacle portion in the second auxiliary joining element 5 is formed as a through-opening and the fastening portion 13A of the first auxiliary joining element 4 projects through the second auxiliary joining element 5. During pressing-in, the fastening portion 13A forms, on the exit side, a head portion 21 that produces the form fit and projects laterally beyond the through-opening.

Figure 4:
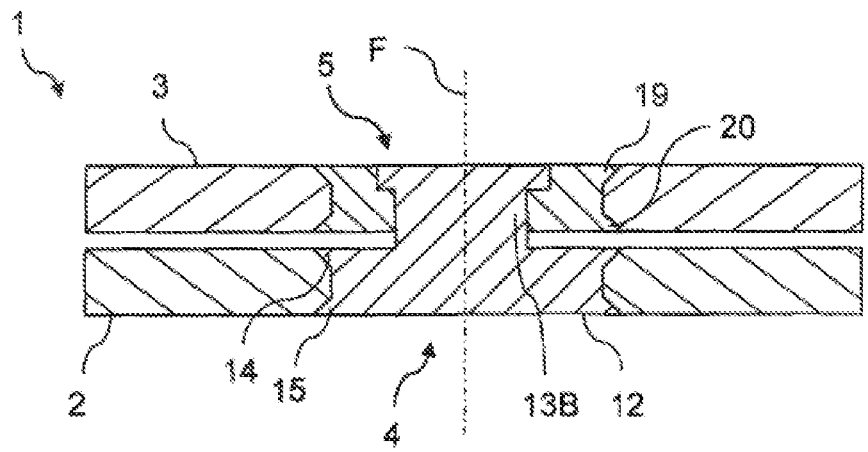

The component assembly 1 can, in a further configuration, also be designed such that the fastening portion 13B terminates flush with the second auxiliary joining element 5, as illustrated in FIG. 4.

Figure 5:
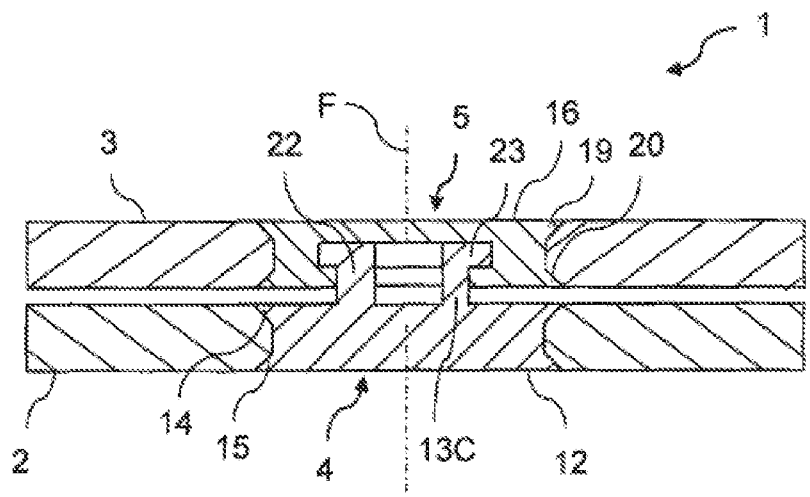

Instead of the fastening portion 13, 13A, 13B, shown in FIGS. 1 to 4, which is deformed by pressing-in, the component assembly 1 can likewise be produced by a type of clip connection. To this end, it is possible for example for the fastening portion 13C, as shown in FIG. 5, to be formed with two arms 22, 23, which, upon introduction into the fastening receptacle portion 17, are initially elastically deformed and engage in the recess 18 in the end position. Such a clip connection has the advantage that it can be designed as a releasable connection. The clip connection can likewise terminate flush with the component surface or project therebeyond.

Figure 6:
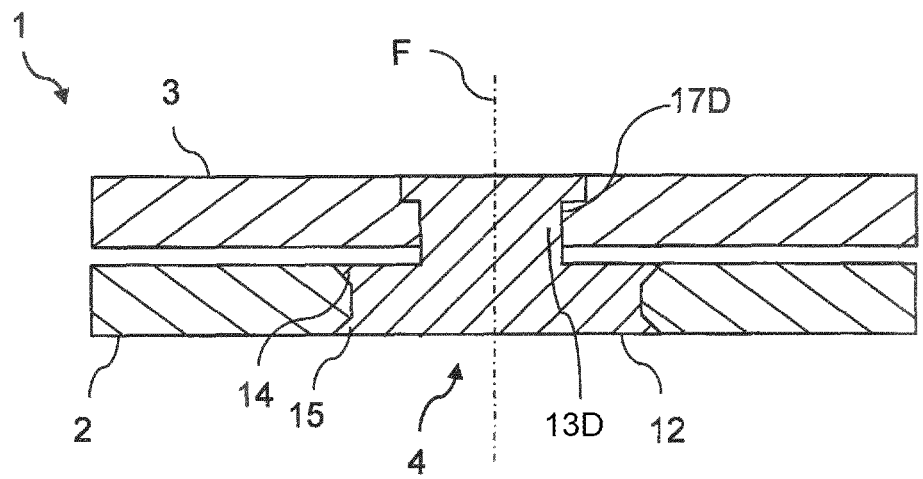

To form the component assembly, the fastening receptacle portion can also be formed directly in the base material of the second component, and it is then possible to dispense with the introduction of a second auxiliary joining element. FIG. 6 shows for example such a component assembly 1, in which, in the second component 3, a fastening receptacle portion 17D in the form of a through-hole has been formed, and the fastening portion 13D of the auxiliary joining element 4 in the first component 2 projects through the through-hole 17D and has been pressed into the latter in a form- and force fitting manner.

Figure 7:
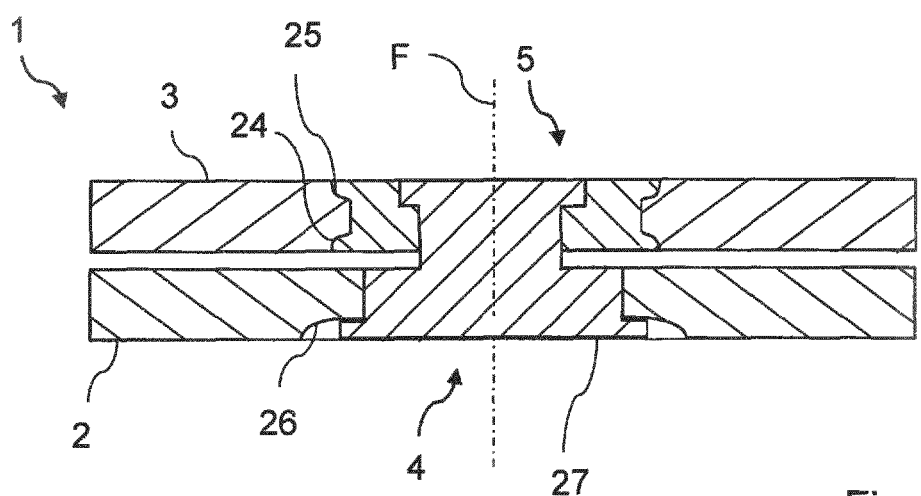

The form of the indentation is not limited to the chamfer geometry shown; rather, modifications are possible, for example the domed or trough-shaped indentations 24, 25 and 26, illustrated in FIG. 7, or the like. The retaining portion can flow into the indentations as a result of the pressing-in, as illustrated in FIG. 7 for the component 3, or, before the pressing-in, already have a shape which bears in the manner of an undercut against the indentation, for example the auxiliary joining element 4 shown in FIG. 7 with an expanded head portion 27 in the region of the retaining portion.

The components 2, 3 can likewise be made of other materials, for example another lightweight material, for example a fiber composite plastic, or of a steel material. It is likewise possible for other materials to be used for the auxiliary joining elements 4, 5. The component assembly can connect together components of identical material or components made of different materials. In addition, the component assembly can include more than the shown two components. Thus, it is possible for example to first of all join together two components by way of an auxiliary joining element in the manner of a riveted connection, and then to produce the described component assembly with a further component by way of a further auxiliary joining element. It is also possible for further components to be joined to the component assembly in some other way. For example, it is also possible for a further component, for example a steel component, to be connected to the first or second auxiliary joining element by way of resistance spot welding.

The shown gap between the components is not necessary. In the component assembly, the components can also rest directly on one another.

In contrast to conventional component assemblies with auxiliary joining elements, a much smaller height of the component assembly can be achieved, since the auxiliary joining elements can, if required, terminate flush with the workpiece surfaces.

It is likewise possible, during the pressing of the auxiliary joining element into the component, for a protective layer (not illustrated), for example a film for preventing contact corrosion, to be additionally introduced between the auxiliary joining element and the hole wall.

Although two chamfers are shown in each case in the figures, the through-holes in the components can also each be provided with a chamfer only on one side, or the chamfers can be formed in an asymmetric manner.

In the figures, for reasons of clarity, the profile of the hole wall is illustrated as if the inclined hole wall transitions directly into a perpendicular hole-wall portion in the region of the chamfer. In reality, however, it is possible for a collar-like encircling plateau to be formed between the inclined wall portion and the perpendicular wall portion, said plateau being brought about by the geometry of the impressing stamp.

As a result of the impressed chamfer in the through-hole and the pressed-in auxiliary joining element, very high strengths are achieved. For example, in one test, a through-hole with a core diameter of 12 mm was formed in a sheet made of a 5000 series aluminum alloy (basic strength of 120 to 140 N/mm$^2$) with a thickness of 2.5 mm. At the peripheral regions, a chamfer was impressed at an angle of 45 degrees with an impression depth of 0.7 mm and a plateau width of 0.4 mm. A cylindrical sheet-metal slug made of S355 with a thickness of 4 mm and a diameter prior to pressing of 11.7 mm was pressed into the through-hole. After pressing, pull-out forces for the slug of 8.5 to 12.6 kN resulted for each side.

The exemplary embodiments are not true to scale and not limiting. Modifications that fall within the routine activities of a person skilled in the art are possible.

LIST OF REFERENCE SIGNS

1 Component assembly
2, 3 Components
4, 5 Auxiliary joining element
6, 7 Through-hole
8-11 Indentation
12 Retaining portion
13-13D Fastening portion
14, 15 Undercut
16 Retaining portion
17, 17D Fastening receptacle portion
18 Recess
19, 20 Undercut
21 Head portion
22, 23 Arms
24, 25, 26 Indentation
27 Head portion
F Joining axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component assembly of at least two components which are joined at at least one joint, comprising:
   a first component, wherein, at the joint, a first auxiliary joining element has been pressed with a retaining portion into a through-hole in the first component; and
   a second component, in which a fastening receptacle portion is formed at the joint, wherein the first auxiliary joining element has a fastening portion which engages in a form-and/or force-fitting manner in the fastening receptacle portion of the second component,
   wherein the fastening receptacle portion is part of a second auxiliary joining element, that has been pressed with a retaining portion into a through-hole in the second component at the joint.

2. The component assembly according to claim 1, wherein the through-hole in the first component is expanded in at least one peripheral region by an indentation, into which the retaining portion of the auxiliary joining element engages.

3. The component assembly according to claim 2, wherein the indentation is in the form of a chamfer.

4. The component assembly according to claim 1, wherein the through-hole in the first component and/or in the second component is expanded in at least one peripheral region by an indentation, into which the retaining portion of the auxiliary joining element engages.

5. The component assembly according to claim 4,
   wherein the through-hole is expanded in both the peripheral regions by the respective indentations.

6. The component assembly according to claim 5, wherein the indentations are in the form of a chamfer.

7. The component assembly according to claim 1, wherein an interlayer element has been introduced between the retaining portion and the component into which the retaining portion has been pressed.

8. The component assembly according to claim 7, wherein the retaining portion is additionally connected in a materially bonded manner to the interlayer element and/or the component into which the retaining portion has been pressed.

9. The component assembly according to claim 1, wherein the fastening portion has been permanently pressed into the fastening receptacle portion.

10. The component assembly according to claim 1, wherein the first and/or second component is/are made of a lightweight material and the auxiliary joining elements are made of steel.

11. The component assembly according to claim 1, wherein the component assembly is part of a vehicle body.

* * * * *